United States Patent

[11] 3,597,751

[72] Inventors Robert F. Heldecker
Longmont;
Friedrich R. Hertrich, Boulder, both of, Colo.
[21] Appl. No. 817,761
[22] Filed Apr. 21, 1969
[45] Patented Aug. 3, 1971
[73] Assignee International Business Machines Corporation
Armonk, N.Y.

[54] SIGNAL RECOVERY SYSTEM FOR USE WITH MAGNETIC MEDIA
11 Claims, 7 Drawing Figs.

[52] U.S. Cl. .......... 340/174.1
[51] Int. Cl. .......... G11b 5/04
[50] Field of Search .......... 340/174.1
G, 174.1 H

[56] References Cited
UNITED STATES PATENTS
3,478,255 11/1969 Parker et al. .......... 340/174.1
3,503,059 3/1970 Ambrilo .......... 340/174.1

*Primary Examiner*—Bernard Konick
*Assistant Examiner*—Vincent P. Canney
*Attorneys*—Hanifin and Jancin and Herbert F Somermeyer ABSTRACT: The readback signal from a magnetic media is characterized by signal components of frequency F and frequency 2F, with shifts between such signal components. Normally, the F signal component has a greater amplitude than the 2F signal component. For recording binary data, a bit period of recording is equal to the wavelength of the 2F signal component. For data signal recovery, the readback signal is delayed by a period equal to one bit period. The delayed signal is then differenced with the readback signal in a linear manner such that the F signal components are added together in an absolute manner, while the 2F signal components are substantially cancelled. The amplified F signal components are then amplitude detected. Since there is a phase reversal of the 2F signal component each time the F signal component occurs, a reversing switch is utilized to maintain the phase of the clock the same irrespective of the phase of the 2F signal. In one embodiment, a pair of sample-and-hold circuits are used to provide signal delays.

INVENTORS
ROBERT F. HEIDECKER
FRIEDRICH R. HERTRICH

BY [signature]

ATTORNEY

SIGNAL RECOVERY SYSTEM FOR USE WITH MAGNETIC MEDIA

BACKGROUND OF THE INVENTION

This invention relates generally to magnetic recording and, more particularly, to improvements in the recovery of signals from magnetic media having a relative movement with respect to a sensing transducer.

Magnetic recording systems capable of storing digital data, especially binary data, are used extensively with electronic data processing equipment, communications equipment, and the like. To improve the performance capabilities of such magnetic recording systems, there has been continuing effort to improve the recording density of such systems. That is, the number of bits or digits of digital data recordable on a linear inch of the magnetic recording media is desired to be as large as possible. Presently, high-density recording resides in the area of 6,000 to 10,000 recorded bits per lineal inch of magnetic media. The width of the recording varies with system design. It is anticipated that such recording densities will be increased in the future. Playback or readback of a magnetic recording is usually accomplished by amplifying the small amplitude signals induced in a magnetic reproducing or read head as the magnetic media moves past the latter. As the recording density is increased, the amplitude of the signals supplied by the readback head have a tendency to decrease; thereby increasing the difficulty of faithfully reproducing the recorded digital data. Other operational difficulties, later referred to herein, are also encountered.

The digital data is represented on the magnetic media, either as changes in magnetic flux, the polarity of magnetic flux, or as different frequencies of changing of magnetic flux in a given area of the media, often referred to as a "bit cell" or "cell." The duration of time for a transducer to scan one bit cell is termed a "bit period." Timing in digital recording systems is based on such bit periods. For example, in the RZ and NRZ (return to zero and nonreturn to zero) recordings, binary data is recorded as a given polarity of magnetic remanence in the magnetic media. For example, a positive magnetic remanence may represent a binary "1," while a negative magnetic remanence may represent a binary "0." At increasing bit recording densities, there is a merging of the recordings in adjacent cells. For alternate "1's" and "0's," there time a sharp demarcation between adjacent recorded areas. This results in a high rate of change of magnetic flux ($d\Phi/dt$) in the magnetic reproducing head, causing a large signal to be induced in the transducer. However, when a series of "1's" or a series of "0's" are recorded, the merging reduces the change in flux in adjacent recording areas and, thereby reduces the $d\Phi/dt$. This action results in a small amplitude readback signal being supplied by the transducer. As such, the difficulty of detecting a string of "1's" or a string of "0's" is substantially increased.

Another recording scheme is the NRZI, which records a change in magnetic flux polarity in a bit cell each time a binary "1" occurs. In a given bit cell, binary "0's" are represented by no change in flux polarity on the magnetic media. High-density problems with NRZI include obtaining reliable clocking information such that a string of "0's" may be faithfully identified as well as other operational difficulties later referred to.

Yet other systems of magnetic recording include frequency modulation scheme, wherein a binary "0" is represented by a first frequency of flux reversals, and a binary "1" is represented by a second frequency of flux reversals. Usually the binary "1" is represented by a signal of twice (or other harmonics) the frequency of a binary "0." A somewhat related system is phase encoded recording, wherein a binary "1" is represented by flux reversals having a first phase, and a binary "0" represented by flux reversals having an opposite phase. That is, in a given bit cell, a binary "1" may be represented by a flux reversal(s) consisting of a North pole and then a South pole; while a binary "0" is represented by a magnetic flux in a bit cell first having a South pole and then a North pole. Phase encoded recording also includes a plurality of flux reversal cycles during a given bit cell. These latter recording systems also suffer from operational difficulties in data signal recovery systems as bit density is increased to high levels.

In addition to reduced signal amplitudes, operational difficulties in faithfully reproducing recorded digital signals include peak shift, base line shift, signal bandwidth problems, problems due to separation (i.e., the magnetic media loses contact with the transducer) and noise interferences.

Peak shift is a term applied to the readback signal, which indicates a shift of recording cell boundaries. Peak shift also looks like longer duration recorded pulse or signal than was actually recorded. It is believed that peak shift of certain signal to the detriment to the recovery of adjacent signals is caused by the so-called high frequency rolling off in the readback transducer head within the operating bandwidth of the signal recovery system. Irrespective of the cause of peak shift, it is a problem in the faithful reproduction of recorded digital signals. Accordingly, it is desirable to have a signal recovery system that is tolerant to peak shift of readback signals.

Another problem is the so-called base line shift in a readback signal. Normally, a recovery or readback circuit has a given reference potential. If certain digital patterns are recorded in a magnetic media, many readback systems introduce a DC component into the readback signal. This DC component, termed base line shift, adversely affects the amplitude detection of readback or recovered signals in that the DC component yields a false indication of AC amplitude representing the recorded data signals. This phenomenon is well known and will not be further described for that reason. Because of reduced AC amplitudes in high density recordings this base line shift should be substantially eliminated.

Other problems of recovering signals of high density recordings include the reduction in the amplitude of the readback signal caused by separation of the magnetic media from the transducer (i.e., a magnetic tape has momentarily become in noncontact relation to the transducer), good synchronization of a clock or gate pulse generator for faithfully recovering all of the digital data, as well as good noise immunity. In other words, faithfully recovering high density recorded digital signals presents significant technical difficulties not yet effectively overcome.

Some digital signal recovery circuits attempt to reconstruct the original recording signal for using such reconstructed signal as the output signal. Such systems have used differentiators, integrators, as well as signal limiters. Such devices, in changing the shape of the readback signal, increase system susceptibility to noise, if not introducing noise into the readback signal by the shaping of the signal. It is desired to provide a signal recovery system which manipulates the readback signal in a linear manner (does not distort or reshape the signal).

Other signal recovery systems have introduced one-half bit period delayed signal with a currently readback signal. Such systems can compensate somewhat for peak shift and accentuate amplitudes of the signal peaks of the signal components in the readback signal. Such systems have not maximized the difference between signal components representative of different recorded data signals; therefore, have not maximized or optimized detection of which signal component occurred in a given bit period.

SUMMARY OF THE INVENTION

It is an object of the present invention to provide a data signal recovery circuit for use with a magnetic media and which utilizes a maximum energy content difference between two signal components in the readback signal to obtain faithful amplitude detection.

It is another object of this invention to provide an easily synchronized clocking system for use in the recovery of recorded digital data.

A data recovery system recovers data recorded in a magnetic media by utilization of a transducer to convert same to electrical signals termed a readback signal. Such readback signals are then detected in accordance with the teachings of this invention. Linear signal translation means, including transducing means operatively associated with the magnetic media, detects the magnetic flux changes representative of the recorded digital data, and supplies same as two readback signals, each having first and second harmonically related signal components (usually first and second harmonics) and shifts in frequency therebetween. A fist readback signal has a predetermined phase or time delayed relationship to the second readback signal equal to one bit period. Linear signal processing means receive the first and second readback signals and manipulate same for producing a third signal having unipolar undulations consisting of substantially only one of the signal components, while the other signal component has been substantially eliminated. The remaining signal component is then amplitude detected.

In one embodiment of the invention, a delay line is used to delay the first readback signal for one bit period. The delayed signal component is then differenced in a linear manner with the second readback signal to accent a low frequency signal component while eliminating a high frequency signal component. The low frequency component has one-half cycle of flux reversal in each bit period (i.e., a 180° shift). Differencing or subtraction almost doubles the amplitude of such signal component. The high frequency component is an even harmonic of the low frequency component such that one bit period delay is a 360° phase delay. This delay causes an in-place relation between the first and second signals resulting in signal cancellation when such two signal components are differenced or subtracted.

In accordance with another aspect of the invention, a pair of sample-and-hold circuits may receive the readback signal during alternately successive bit periods. The output signals of the two sample-and-hold circuits are compared for amplitude differences, and, if different, a first signal component is indicated and, if the same, a high frequency or second signal component is indicated. The alternation of the reception of the readback signal may be controlled by gate pulses supplied from a clock channel used to time an amplitude detector in the recovery circuit.

The foregoing and other objects, features and advantages of the invention will be apparent from the following more particular description of preferred embodiments of the invention, as illustrated in the accompanying drawings.

DETAILED DESCRIPTION

Figure 1:
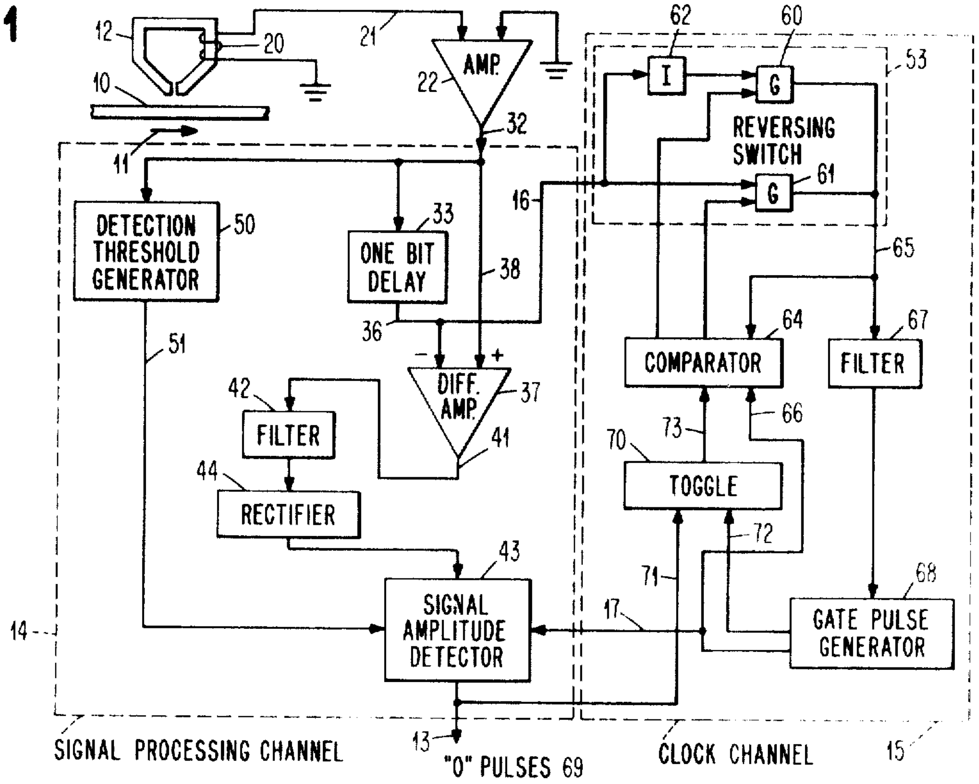
FIG. 1 is a simplified signal flow diagram of an illustrative embodiment of the present invention, showing a signal processing channel and a signal-synchronized clock pulse generating channel.
Figure 2:
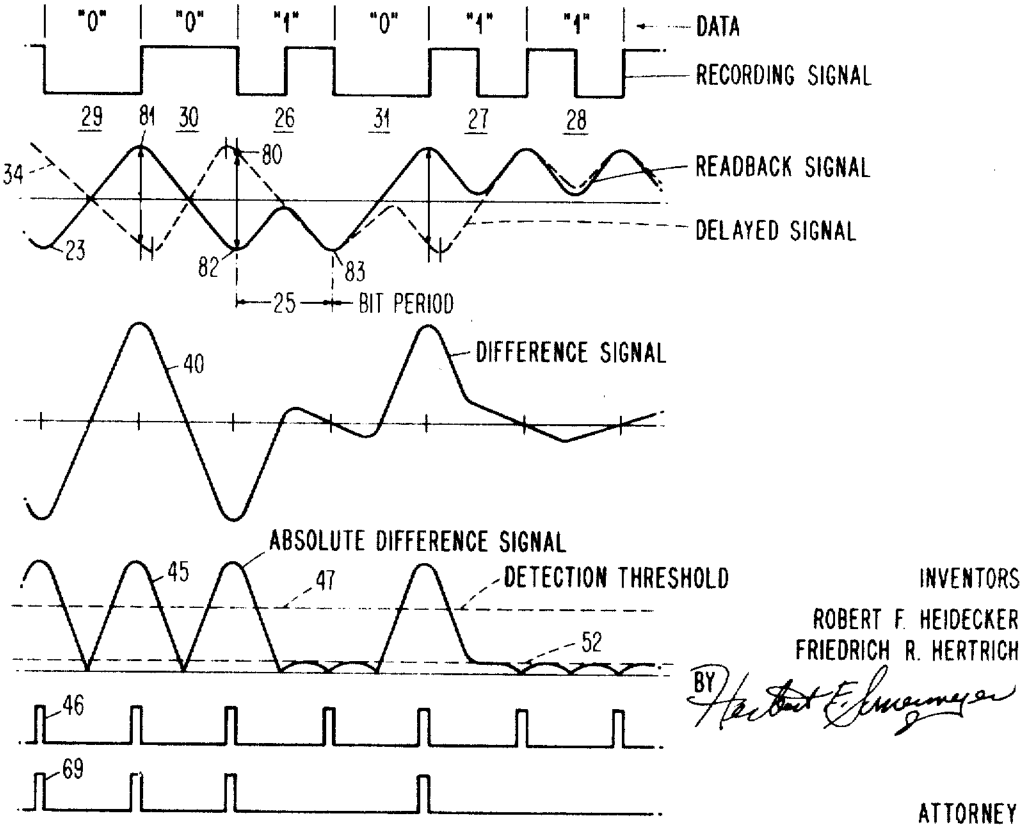
FIG. 2 is a set of idealized signal waveforms used to illustrate the operation of the FIG. 1 illustrated embodiment.

Referring more particularly now to the appended drawings, like numbers indicate like parts and structural features in the various illustrations. Referring first to FIG. 1, digital data signals previously recorded on a magnetic media 10 transported in the direction of the arrow 11 are converted to an electrical readback signal on line 21 by magnetic transducing head 12. Such readback signal is demodulated for recovering the recorded information to produce output data pulses on line 13 by recovery circuit including signal processing channel 14 and gate pulse generating or clock channel 15. Clock channel 15 is responsive to a readback signal supplied over line 16 to generate gate pulses supplied over line 17 in a timed relation to such readback signal. The electrical signal induced in winding 20 of magnetic reproducing head 12 is supplied over line 21 through linear high-gain amplifier 22 to signal processing channel 14 as amplified readback signal 23. Signal 23, shown in a smoothed and somewhat idealized form in FIG. 2, represents the binary digital data indicated at the top of the figure. The signal recording waveform 24 represents a binary "0" in those portions thereof having an "F" signal frequency with a wavelength equal to the duration of two bit periods 25. Such wavelength is also one-half cycle per bit period. A binary "1" is represented in the recording as a 2F signal frequency indicated in bit periods 26, 27, and 28. Correspondingly, it is seen that the readback signal resulting from a recording of a binary "0" has a frequency F, as in bit periods 29, 30, and 31, whereas the readback signal in bit periods 26, 27, and 28, representative of recorded binary "1's," has a frequency 2F. The illustrated recording scheme is recognized as FM (frequency modulation) or bifrequency recording. No limitation to the practice of this invention is intended.

Returning to FIG. 1, amplifier 22 supplies an amplified readback signal over line 32 to delay line 33. Delay line 33 may be a lumped constant delay line of known construction, designed to delay signal 23 a period of time equal to the duration of one bit period 25. For the present description, assume that the magnetic media 10 is transported past reproducing head 12 at a constant velocity such that the duration of a bit period is constant. Such an arrangement provides for the simplest practice of the present invention; however, no limitation thereto is intended.

Delay line 33 supplies a delayed readback signal 34 over line 36 to a first input of linear differential amplifier circuit 37. The line 32 signal is supplied over line 38 to a second input of linear differential amplifier 37. Differential amplifier 37 supplies a difference signal 40 indicated by the linear amplitude difference between the signals 23 and 34 over line 41. The differential signal is supplied through band pass filter 42 to full wave rectifier 44 and thence to signal amplitude detector 43. Full wave rectifier 44 converts wave 40 to a unipolar signal 45. Signal 45 is then detected in timed relation with the gate pulses 46 supplied by clock channel 15 over line 17 to supply an output pulse on line 13 each time a binary "0" signal has been detected from magnetic media 10 as represented by the positive excursions of signal 45 which exceed voltage amplitude detection threshold 47.

Amplitude detection threshold 47 is automatically generated by detection threshold generator 50. Generator 50 receives the amplified readback signal from amplifier 22 and averages the amplitude, as in an integrator, to supply a DC threshold signal 47 over line 51. In a practical embodiment of the present invention, magnetic media 10 would carry a plurality of recording channels. There would be a like plurality of reproducing heads 12 and signal processing channels 14. Detection threshold generator 50 could receive amplified readback signals from all of the other channels (not shown), sum the amplitudes of the various readback signals, and then average the sum to provide a single threshold for all of the channels. It is understood, of course, each channel may have its own detection threshold generator, such that it is impervious to amplitude variations in the readback signals of other channels which may be remotely located on the recording media. Of course, detection threshold generator 50 may be merely a DC source and supply a DC threshold over line 51 of arbitrary amplitude. Because the amplified readback signal on line 32 may become zero because of the movement of magnetic media 10 away from the reproducing head 12, a minimum amplitude threshold 52 is provided by detection threshold generator 50. Threshold 52 is selected in accordance with the noise level in the reproducing system and will be better understood as later described herein. Signal amplitude detector 43 may be of usual design or may be of the design illustrated in FIG. 3, as later described.

Clock channel 15, supplies gate pulses 46 over line 17 in timed relationship to the readback signal on line 32 in response to delayed readback signal 34 on line 16. Before describing synchronization of the clock pulses with the readback signal, some observations will be made as to the relationship of linear delayed readback signal 34 and amplified readback signal 23, as well as shifting between the two frequencies in the readback signals. The amplitude detection is performed on unipolar signal 45, which is generated based on linear differencing comparisons of the delayed signal 34 and amplified readback signal 23. The clock channel 15, if synchronized with amplified readback signal 23 waveform, could change phase before the delayed readback signal 34 on line 36 has been amplitude detected. Therefore, to prevent the anticipation of a phase change which could result in less reliable amplitude detection, the delayed waveform 34 is supplied over line 16 to synchronize clock channel 15.

As amplified readback signal 23 is shifted between the lower frequency signal component F, representing binary "0' s," and the higher frequency or 2F signal components, representing binary "1's," and back again; there is a 180° phase shift (or phase reversal) of the 2F signal component. This is seen in FIG. 2, wherein bit period 26 has a first occurring binary "1" signal wherein the first half of the bit period is occupied by a relatively negative recording signal which may correspond to a recorded south pole, for example. The next succeeding recorded information is in bit period 31, wherein a binary "0" is recorded. In bit period 27, the next binary "1" occurs, wherein the first half of the bit period is occupied by a relatively positive recorded signal, or a north pole, for example. This action is a phase-reversal or a 180° phase shift. It is apparent that another binary "0" recorded between the "1's" recorded in bit periods 27 and 28 will result in a return to the readback signal phase shown in bit period 26. In the illustrated embodiment, it is desired to maintain clock synchronization in accordance with only one of the two possible phases of the 2F signal. In accordance therewith, reversing switch 53 is provided at the synchronizing input of clock channel 15. Reversing switch 53 includes a pair of AND gates 60 and 61, together with signal inverter 62. It is well known that inverter 62 supplies the 180° phase reversal of the signal on line 16.

Each time a zero data pulse is supplied over line 13, reversing switch 53 should be changed in order to maintain a constant phase for the signal on line 65. It is remembered that each time a zero signal is recovered, there is a 180° phase change in the 2F signal supplied by amplifier 22. To effect the change, the zero data pulses are supplied over line 71 to toggle circuit 70. Toggle circuit 70 is responsive to such pulses to supply a phase reversing signal over line 73, as timed by pulses supplied over line 72 from generator 68, to comparator 64, which effects switching action in reversing switch 53. However, in starting the tape reading operation or in the event a zero pulse is not correctly detected or an additional zero pulse is detected, then the phase of the signal on line 65 will be 180° with respect to what it should be. To correct the situation by reversing the switch 53, gate pulses 46 are supplied over line 66 to comparator 64. Therein these pulses are phase compared with the signal on line 65. If there is a 180° phase difference, then comparator 64 effects a reversing action in switch 53. Alternatively, the output signal of filter 67 could be likewise phase compared with the line 65 signal. However, it is believed that the pulse comparison is a more fascile manner of effecting the change.

In a magnetic recording system wherein the magnetic media 10 is subjected to variations in velocity, a phase lock loop may be substituted for filter 67 to maintain a more linear relationship between the phase of the readback signal as it appears on line 32 and the gate pulses supplied over line 17.

Gate pulse generator 68 receives the filtered constant phase signal from filter 67 and is responsive thereto to generate gate pulses 46 of short duration, to strobe the unipolar or third signal 45 for amplitude detection. The resultant output data pulses 69 on line 13 are supplied to utilization means (not shown).

The operation of differential amplifier 37 on the one bit period delayed readback signal 34 on line 36 with the amplified readback signal on line 38 can be thought of as comparing the amplitude of the readback signal at the beginning of the bit period, with the amplitude thereof at the end of the bit period. For example, point 80 on delayed readback signal 34 is the same as point 81 on amplified readback signal 23, but delayed one bit period 25. Differential amplifier 37 forms the difference of the two waveforms between points 80 and 82; such action is the same as measuring the difference in amplitude of waveform 23 between points 81 and 82, respectively, at the leading and trailing edge portions of bit period 30. In the illustration, the difference of amplitude in a "0" recorded waveform is substantially large, as represented by the positive going undulations in signal 45. The 2F signal component, representing a binary "1," has the same amplitude irrespective of phase, at the beginning and end of a bit period such as the amplitudes at points 82 and 83. Therefore, taking the difference between these two points results in a "0" signal output. By using the differencing approach, any base line shift is eliminated. That is, the signal to be detected by the amplitude detector is a difference signal wherein DC components cancel out.

Based upon the above discussion, it is seen that, if plural cycles were used to represent binary "0's" and binary "1's," the delay of the readback signal should be an integral number of cycles of one of the waveforms; preferably, the higher frequency signal component. It is also observed that the binary "0" readback signal is an odd harmonic, and the binary "1" is represented by an even harmonic of the bit period 25. The practice of this invention will include multiples of the first and second harmonics so long as one of the signal components is an odd harmonic and the other is an even harmonic. The principles of this invention may be utilized for accenting one of the harmonics and substantially eliminating another of the harmonics for facilitating single polarity amplitude detection of the readback signal.

Figure 3:
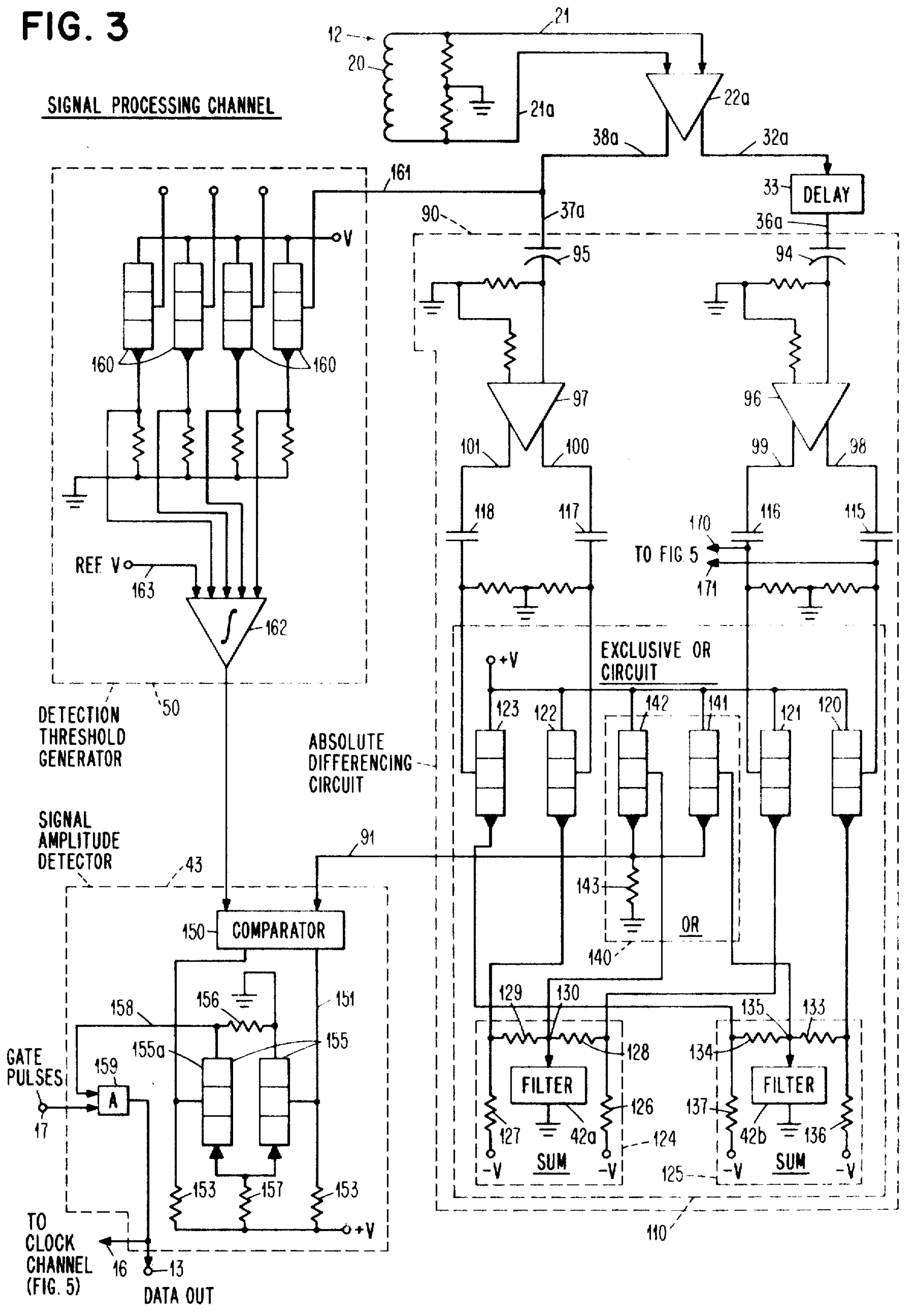
FIG. 3 is a simplified schematic diagram of a linear circuit usable to implement the FIG. 1 illustrated signal processing channel.
Figure 4:
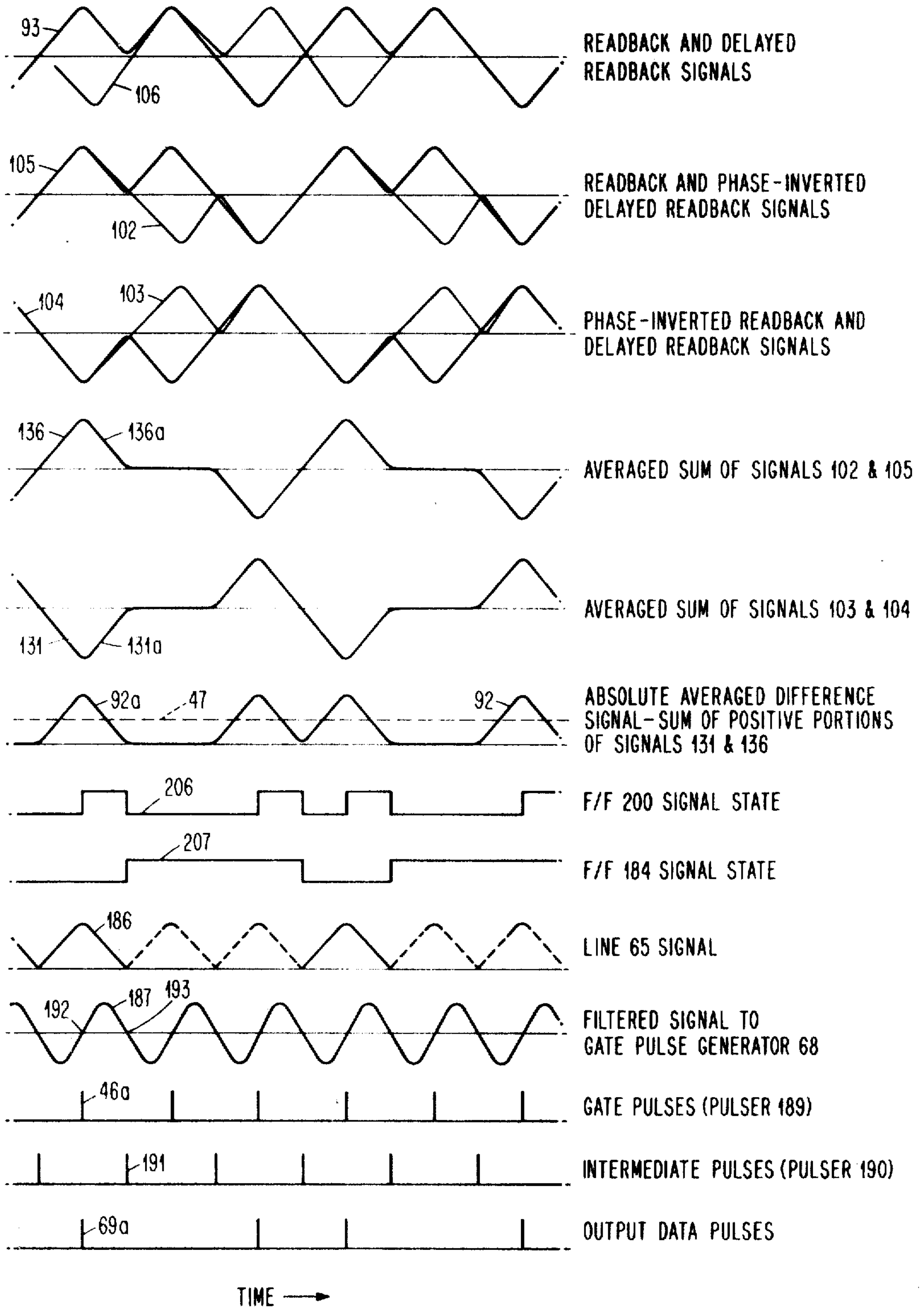
FIG. 4 is a set of idealized signal waveforms usable to describe the operation of the FIGS. 3 and 5 illustrated circuits.

Referring now more particularly to FIGS. 3 and 4, an exemplary signal processing channel using the present invention is described in detail. Certain differences exist between the FIG. 1 illustrated channel 14 and the FIG. 3 illustrated channel, in that the readback signal from reproducing head 12 is taken as a double-ended signal over lines 21 and 21*a*, and respectively supplied to the differential inputs of differential amplifier 22*a*. A noninverted amplified readback signal 93 is supplied over line 38*a*, corresponding to line 38 in FIG. 1. The complimentary or phase-inverted readback signal 106 is supplied over line 32*a* (corresponding to line 32 in FIG. 1) to delay network 33, which may be constructed the same as the delay network in FIG. 1. The amplified readback signal 93 on line 38*a* and the delayed readback signal 106 on line 36*a* are supplied to absolute differencing circuit 90, which provides a signal over line 91 representative of the absolute difference in amplitude of the signals on lines 36*a* and 38*a*. The line 91 signal corresponds to waveform 45 of FIG. 1, and is shown as signal 92 in FIG. 4. Unipolar signal 92 is derived from readback signal 93 supplied over lines 21 and 21*a*. The FIG. 3 absolute differencing circuit 90 performs the functions of items 37, 42 and 44, shown in FIG. 1.

The signals on lines 36*a* and 38*a* are AC coupled through capacitors 94 and 95 to a pair of differential amplifiers 96 and 96, each having one of their inputs connected to ground reference potential. The outputs of the amplifiers 96 and 97 are split-phase (i.e., the normal and complement signals are supplied respectively over lines 98, 99, 100, and 101). These four sets of signals are respectively shown in FIG. 4 as signals 102, 103, 104, and 105. Signals 102 and 103 are the normal (same phase) and complement (opposite phase) of delayed readback signal 93, while signals 104 and 105 are respectively the normal and complement of phase-reversed amplified readback signal 106.

The signals supplied from linear amplifiers 96 and 97 are then processed through exclusive OR circuit 110. Exclusive OR circuit 110 manipulates the amplifier supplied signals 96 and 97 as later described to derive unipolar signal 92 having only the F frequency signal components and having the 2F signal components suppressed. Unipolar signal 92 on line 91 is compared with the amplitude threshold supplied over line 51 from detection threshold generator 50 and then strobed by gate pulses 46*a*, received over line 17, to generate appropriate data pulses 69*a* supplied over line 13 to utilization means (not shown). It is understood that, if it is desired to use pulses to represent binary "1's," known circuits may be used to generate pulses from data pulses 69*a* or interval to detector 43 for representation of binary "1's" and no pulses for the representation of binary "0's." It is further understood that information represented is an arbitrary choice and no limitation thereto is intended.

Turning now to the detailed circuit operation of exclusive OR circuit 110, lines 98 through 101 are respectively coupled through capacitors 115 through 118 to four emitter-follower-connected transistor amplifiers 120 through 123. These emitter-follower-connected transistor amplifiers provide a lower impedance as an input to the two summing circuits 124 and 125. Circuit 124 sums in a linear manner signals 103 and 104, respectively, from lines 99 and 100. The emitter electrodes of the transistors 121 and 122 are connected to their respective emitter-follower resistors 126 and 127 and supply the signals 103 and 104 through the matched summing resistors 128 and 129 to summing node 130. Filters 42*a* and 42*b* are turned to frequency 2F and connected as shown in summers 124 and 125. Signal 131 at node 130 is the sum of the line 99 and 100 signals divided by 2 (the average amplitude of the input signals). The signals 102 and 105, respectively on lines 98 and 101, are summed by circuit 125 through the matched current summing resistors 133 and 134 to summing node 135. At node 135, signal 136 is the sum of the signals 102 and 105 divided by 2. Resistors 137 and 138, respectively, are the emitter-follower resistors for transistors 120 and 123. The emitter-follower transistors 120, 121, 122, and 123 have their collector electrodes commonly connected to a +V voltage supply.

The signals 131 and 136 are supplied through OR circuit 140 to line 91. OR circuit 140 consists of emitter-follower-connected transistors 141 and 142, respectively, having their base regions electrically connected to the summing nodes 135 and 130. The emitter electrodes are commonly connected at line 91 to OR circuit resistor 143. The operation is that either emitter-follower transistor 141 or 142 being the most current conductive will control the voltage on line 91. That is, one can look at the emitter-follower transistors 141 and 142 as variable resistors. Because of the voltage division action between the effective resistance of transistors 141 and 142 and the resistance of fixed resistor 143, the smaller the resistance of transistors 141 and 142, the greater the portion of voltage V will be supplied to line 91. Assume that transistor 141 is receiving a relatively negative voltage, making it appear as an effective high impedance. Any voltage drop thereacross will cause the voltage in line 91 to be relatively low. However, assume that the electrical impedance of transistor 142 is made relatively low by receipt of a relatively positive voltage from summing node 130. Since the low impedance of transistor 142 is in parallel circuit with the high impedance of transistor 141, the high impedance of transistor 141 does not materially affect the voltage on line 91. Therefore, the combination of transistors 141 and 142 supplying current to fixed resistor 143 can be viewed as a positive signal OR circuit. That is, the more positive signal at either base electrode of transistors 141 or 142 controls the voltage on line 91. This function effects a rectification of the two signals 131 and 136 to generate unipolar signal 92. For example, portion 92*a* of signal 92 results from signal 136 going positive, as at 136*a*. Simultaneously therewith, signal waveform 131 is going negative, as at 131*a*, causing transistor 142 in OR circuit 140 to become relatively high impedance. Therefore, the effect of signal waveform 131 on the generation of signal 92 is minimized, while signal 136 has maximum effect. Contrariwise, when signal 131 is positive, then the signal 136 is correspondingly negative, causing signal 92 then to substantially conform to the positive-going excursion of signal 131.

The connection to the summers 124 and 125 are such that the 2F signal components, represented by signal waveforms 103 and 105, are of opposite polarity during the summing action, while the F frequency signal components are in-phase. The same is true for summer circuit 125 which sums the signal waveforms 102 and 104. In this way, the delayed signal, as delayed by delay network 33, in combination with the exclusive OR circuit, cancels out the 2F signal components and adds or accents the F frequency signal component which, in the illustrated embodiment are representative of a recorded binary "0." Since the signal 92 is always positive with respect to a reference potential indicated by line 145, the differencing or subtraction is an absolute subtraction or differencing and is insensitive to the polarity of the readback signal or of the recorded signal as represented by polarity of magnetic remanence.

The DC detection threshold signal 47 is supplied over line 51 to comparator 150 in signal amplitude detector 43. Comparator 150, a saturating differential amplifier, supplies a signed (bipolar) two-state differential signal over lines 151 and 152 as developed across the pair of resistors 153 to a pair of differentially connected PNP transistors 154 and 155. The collector of the transistor 154 is connected to fixed resistor 156, while the collectors of transistor 155 is connected to ground reference potential. The emitters of the transistors 154 and 155 are commonly connected to +V volts. When the unipolar signal 92 exceeds the threshold 47, a more positive signal is supplied on line 152, such that the transistor 154 becomes more current conductive to provide a relatively positive signal over line 158. This relatively positive signal enables AND gate 159 to pass gating pulses 46*a*, received over line 17. The so-called pulses are supplied over line 13 as output data pulses 69*a* and over line 71 to the clock channel illustrated in FIG. 5.

Generation of the detection threshold 47 supplied over line 51 is described with respect to a four channel recovery system using a common threshold, no limitation thereto intended. Generator 50 has four input emitter-follower-coupled transistors 160, having their base electrodes respectively coupled to receive readback signals from four channels. One of the transistors is connected over line 161 to receive the phase-inverted amplified readback signal on line 38*a*. The four emitter-follower-coupled transistors have their emitter electrodes connected to integrator 162, which receives the readback signals and integrates same to form an average amplitude of the received signals. The time constant of the integrator is appropriately selected to the expected frequencies and variations of signal amplitude of the magnetic recording system with which the recovery system is to operate. In addition, a reference voltage is supplied over line 163 to provide the minimum threshold detection voltage 52 for amplitude detection. Since averaging circuits are well known, they will not be further described for this reason. In addition, other forms of detection threshold generation may be used in the successful practice of the present invention. Alternatively, a manually set detection threshold may be used, although the adaptive detection threshold generation that follows variations in readback signal amplitude is preferred.

The delayed readback signal supplied over line 16, as shown in FIG. 1, is derived directly from the absolute differencing circuit 37*a* of FIG. 3, respectively, over lines 170 and 171, which are also collectively designated by numeral 16'. Line 170 carries the phase inverted signal 102 of the delayed readback signal corresponding to the output of inverter 62 in FIG. 1. The two gates 60 and 61, having their outputs connected to OR circuit 172 (which may be a wire connected as shown in FIG. 1), constitute reversing switch 53 such that, as the phase of the readback signal successively reverses as "0's" are read back, the phase of the signal supplied over line 65 remains constant. This action enables gate pulse generator 68 to be synchronized to the same phase of readback signal at all times irrespective of the pattern of data recorded in the media.

Figure 5:
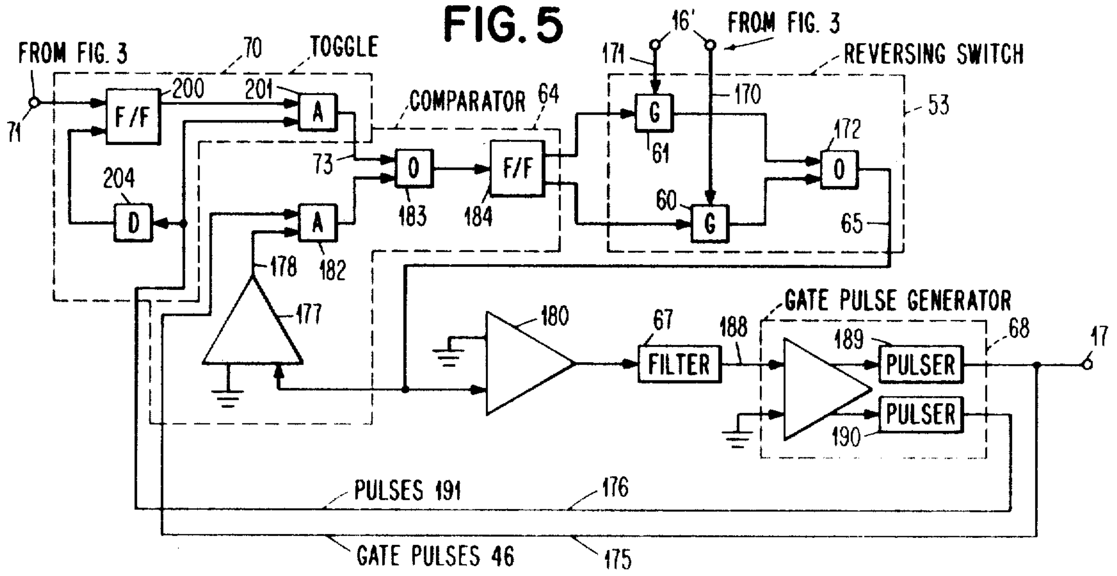
FIG. 5 is a simplified schematic diagram of a clock signal generating channel usable in the FIG. 1 illustrated system.

A constructed implementation of the FIG. 1 illustrated clock channel 15 is explained in detail with respect to FIGS. 4 and 5. The normal and complement delayed readback signals are respectively supplied over lines 171 and 170, collectively denoted by numeral 16', to reversing switch 53. One of the two signals is selected by reversing switch 53 and is supplied over line 65 to synchronize gate pulse generator 68. The selection of the normal or complement signal is under control of comparator 64 and toggle circuit 70, which control reversing switch 53 in a manner to select one of the delayed readback signals on lines 170 and 171 in a manner that gate pulse generator 68 will emit a gate pulse 46 or **46*a* at a predetermined zero crossing of the reference 2F signal 186 on line 65. The line 65 constant-phase signal is supplied through amplifier 180 and, thence through 2F narrow pass band filter 67 to gate pulse generator 68. In signal recovery systems for magnetic recording systems having moving media subject to speed variations greater than 1 percent or 2 percent, a phase lock loop may be substituted for filter 67 to maintain a more linear phase relation. Generator 68 supplies gate pulses 46 or 46*a* over line 17, and thence over line 175 to comparator 64. Therein such gate pulses are compared with the phase of the signal received over line 65 through phase-inverting amplifier 177. If the phases are opposite to the desired phase for synchronizing gate pulse generator 68, comparator 64 causes reversing switch 53 to reverse the selection of phases to the correct one. Such action during initialization as later described ensures correct phasing of the clock. Additionally, toggle circuit 70 receives the output zero data pulses over line 71 and is responsive thereto to reverse the conduction of reversing switch 53, such that the opposite phase is then selected. The latter is the expected mode of operation during readback operations. It is remembered that the phase of the 2F signal component will reverse each time a zero signal is read back, therefore, to maintain a constant phase signal on line 65, a phase reversal of the incoming signals on lines 170 and 171** is required for each emitted output data pulse.

In FIG. 4, the solid portions of signal 186 correspond to the line 65 signal that is derived from signal 102, while the dotted line portions thereof represent those portions of signal 186 derived from signal 103. Inspection of signal 186 shows that the polarity of the signal on line 65 is always positive and that the phase is constant. The line 65 signal being supplied through 2F filter 67 results in filtered gate pulse synchronizing signal 187 being supplied over line 188 to gate pulse generator 68. The line 65 signal 186 has a frequency equal to 2F. The 2F filter 67 smooths the incoming signal and selects the fundamental such that the signal 187 is substantially a pure sine wave, as shown.

Gate pulse generator 68 is responsive to signal 187 in that pulsers or pulse formers 189 and 190 generate pulses of short duration; such as, pulses **46*a* from pulser 189 and pulses 191 from pulser 190. Pulser 189 is responsive to the signal 187 zero crossover going from negative to positive, as at 192, to generate a pulse 46 or 46*a*. In a similar manner, pulser 190 is responsive to the zero crossover of signal 187 from positive to negative, as at 193, to generate a pulse 191. As previously explained, gate pulses 46 (46*a* ) are used in amplitude detector 43 for strobing the amplitude of the readback signal for detecting a binary "0." Inspection of FIG. 4 shows that the pulses 46*a* are aligned in timed relation or in time coincidence with the positive peaks of signal 186 as it appears on line 65. These peaks correspond to the peaks of the readback signal as delayed by delay network 33**.

An initializing operation occurs whenever magnetic media is first being transported past reproducing head 12. This operation occurs at the leading portion of a magnetic tape, for instance. By arbitrary definition, "initialization" occurs by reproducing a string of recorded "0's." It is remembered that gate pulse generator 68 should be phased such that the gate pulses 46 are generated on the zero crossing, such as zero crossing 192 wherein the synchronizing signal is going from negative to positive. Comparator 64 initially compares a gate pulse with the line 65 signal. If out-of-phase flip-flop 184 is toggled, selecting the correct phase, the detected zero pulses supplied over line 71 from signal amplitude detector 43 (FIG. 3) set flip-flop 200 in toggle circuit 70. When set, flip-flop 200 supplies a gate enabling signal to AND circuit 201. AND circuit 201 also receives intermediate pulses 191 (FIG. 4) over line 176. When AND circuit 201 is enabled, one pulse 191 is supplied over line 73 and, thence through OR circuit 18? for toggling reversing switch control flip-flop 184. It is remembered that each time a binary "0" is recorded, there must be a changed in phase of the 2F signal. Therefore, during the initializing period, reversing switch control flip-flop 184 is toggled during each bit period (i.e., for each binary "0" recorded, as above defined). The pulses 191 are also supplied through delay network 204 for resetting flip-flop 200 a short period of time after the occurrence of each pulse 191. This action disables AND circuit 201 until receipt of another output data pulse by flip-flop 200, thereby effecting one and only one reversal of the signal state of flip-flop 184 for each detected zero signal. Reversing switch 53 is actuated once for each "0" data pulse 69.

The toggle circuit 70 is the means to reverse switch 53 for each detected "0" during the readback of recorded data, as is explained with respect to the FIG. 4 signals 206 and 207 which, respectively, indicate the signal state of flip-flops 200 and 184. In these two signals, the positive portion of the signal indicates that the respective flip-flop is in an active condition (i.e., storing a binary "1"), while when negative, the flip-flop is in the inactive condition (i.e., being represented by a binary "0"). Signal 106 represents the set output of flip-flop 200 (i.e., the gate enabling signal) to AND circuit 201. Signal 207 represents the set output of reversing switch control flip-flop 184.

Initially, that is, during the left hand portion of the waveforms in FIG. 4, flip-flop 184 is reset such that gate 60 is enabled to pass the signal 103 through OR circuit 172. Each data pulse **69*a* sets flip-flop 200 to the active condition. The arrangement is such that, each time flip-flop 200 is set to the active condition, a pulse 191 is passed by AND circuit 201, toggling flip-flop 184. Therefore, with the utilization of the toggle circuit 70, the comparator 64 is only used to correct phase reversal errors that may occur in a tape system as may be caused by dropout and the like, and during initialization if generator 68** is 180° out-of-phase.

Figure 6:
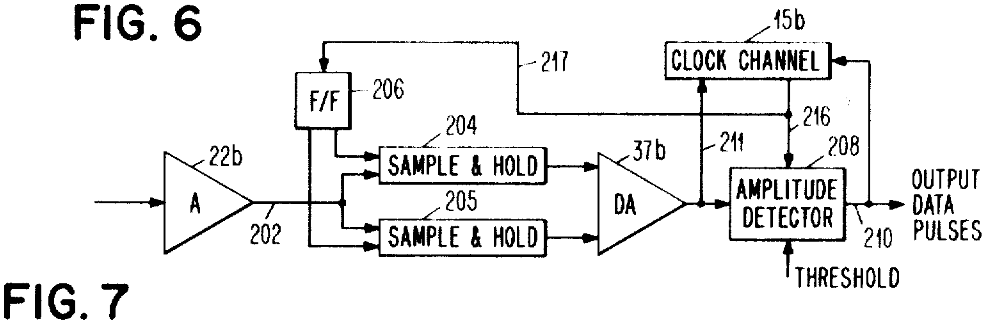
FIG. 6 is a simplified signal flow diagram of another embodiment of the present invention using sample-and-hold circuits rather than delay lines for effecting bit period delayed signal comparisons.
Figure 7:
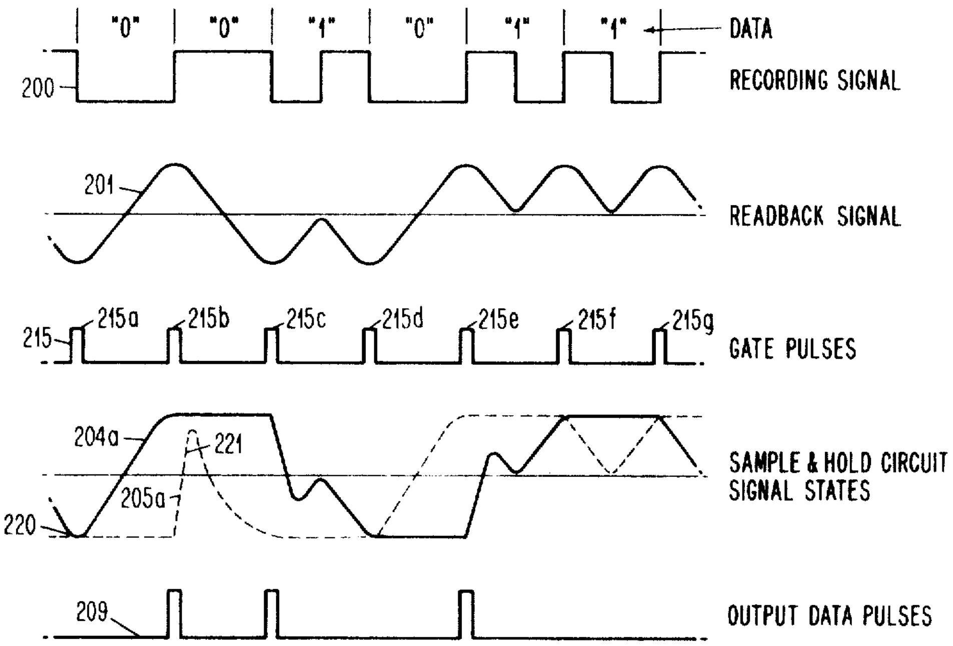
FIG. 7 illustrates a set of idealized signals used in the description of the FIG. 6 illustrated embodiment.

Another embodiment of the invention is illustrated in FIG. 6 and is described with respect to the signals shown if FIG. 7. For purposes of discussion, the data shown in the top row of FIG. 7 is recorded in a single channel (not shown) in operative relationship with the reproducing head 12 of FIGS. 1 and 3. The recording signal 200 wherein a binary "1" is represented by a 2F frequency signal and a binary "0" by an F frequency signal is used to record the data in the channel. The output signal from the reproducing transducers above-mentioned is supplied through high-gain amplifier **22*b*, which supplies readback signal 201 over line 202 to a pair of sample-and-hold circuits 204 and 205. Sample-and-hold circuits 204 and 205** are operated under the control of flip-flop 206 such that first one, then alternatively the other, of the sample-and-hold circuits receives and holds the amplitude of the readback signal 202. This action enables a comparison of the signal amplitudes at the beginnings and ends of every successive bit period.

At the end of a bit period, the readback signal sampling sample-and-hold circuit will be turned off such that the last amplitude will be retained for a succeeding given bit period. During such given bit period, the other sample-and-hold circuit receives the readback signal and then holds it at the end of such given bit period. Differential amplifier 37*b* receives the output signals from the sample-and-hold circuits 204 and 205 to make a comparison thereof, which comparison differences the amplitude of the readback signal at the beginning of such given bit period with the amplitude at the end of such given bit period. Differential amplifier 37*b* supplies a difference signal (not shown) to amplitude detector 208 which supplies output data pulses 209 representative of the data indicated at the top of FIG. 7 over line 210. The output data pulses are representative that the lower frequency signal component (representative of a binary "0") has been detected in the respective bit periods. Such "0" output data pulses are supplied to clock channel 15*b* for reversing the synchronizing phase thereof as explained with respect to FIGS. 1 and 5.

Synchronizing signals for actuating clock channel 15*b* are received over line 211 from differential amplifier 37*b*. The sample-and-hold output signals from circuits 204 and 205 may be combined in an OR circuit (not shown) to synchronize clock channel 15*b*. Clock channel 15*b* is responsive to such synchronizing signals, as explained for clock channel 15, to supply gate pulses 215 over line 216 to amplitude detector 208 for synchronizing its operation as described with respect to FIG. 1. Such gate pulses are also supplied over line 217 to the toggle input of flip-flop 206 for reversing its signal state at the occurrence of each gate pulse. It is remembered that each gate pulse signifies the boundary (i.e., the beginning and end) of two successively occurring bit periods. Therefore, in accordance with the operation of this embodiment, gate pulses 215 are used to toggle flip-flop 206, thereby alternately and successively actuating the two sample-and-hold circuits 204 and 205 to respectively receive the readback signal 201 during alternate successive bit periods.

The detection of the recorded data indicated in FIG. 7 is now described wherein the sample-and-hold circuit 204 has a signal state represented by signal 204*a* while the signal state of sample-and-hold circuit 205 is represented by its output signal 205*a*, which is the dotted line indicated signal in FIG. 7. During the first occurring gate pulse 215*a*, signal state of the sample-and-hold circuits are both at a relatively negative potential, as at 220. As a result, differential amplifier 37*b* supplies a signal of substantially no amplitude to detector 208, resulting in no output data pulse being supplied over line 210.

During second occurring gate pulse 215*b*, the signal state of sample-and-hold circuit 204 is relatively positive, it having sampled signal 201 during the immediately preceding bit period. Sample-and-hold circuit 205 had been deactivated such that its amplitude at point 220 is maintained until the occurrence of second occurring gate pulse 215*b*. Amplifier 37*b* supplies an output signal representative of the amplitude difference between signals 204*a* and 205*a*. Detector 208 is responsive to this relatively large signal (not shown) to supply an output data pulse 209 over line 210. Such output data pulse is also supplied to clock channel 15*b* as explained with respect to FIGS. 1 and 5.

During the bit period between the second occurring gate pulse 215*b* and the third occurring gate pulse 215*c*, sample-and-hold circuit 204 is deactivated while sample-and-hold circuit 205 is activated to receive readback signal 201. This, of course, was accomplished by gate pulse 215*b* being supplied over line 217 to toggle flip-flop 206. The two sample-and-hold circuits 204 and 205 are of usual construction and are not further described for that reason. It is seen that signal 205*a* during the second illustrated bit period follows the signal 201. The leading portion of the positive excursion of signal 205*a*, as at 221, lags the signal somewhat due to the time constant in the sample-and-hold circuit. Such is a design criteria. If a faster response sample-and-hold circuit were supplied, such a delay would not be noticable. At the occurrence of gate pulse 215*c*, the amplitudes of the sample-and-hold circuits 204 and 205 are again substantially different to result in a substantial amplitude signal being supplied to detector 208 for resulting in another output data pulse 209.

In the third occurring bit period, between gate pulses 215*c* and 215*d*, sample-and-hold circuit 204 is again activated while sample-and-hold circuit 205 is inactivated. At the occurrence of gate pulse 215*d*, at the end of the third bit period, the output signals of the two sample-and-hold circuits are identical, resulting in a low amplitude signal being supplied to detector 208, which results in no output data pulse. In a similar manner, the gate pulses 215*e*, 215*f*, and 215*g* all sample the amplitude differences between the beginning and end of the respective bit periods defined by successively occurring gate pulses.

The sample-and-hold circuits 204 and 205, which are inactivated in alternately occurring bit periods, serve the same purpose as the delay line in the FIG. 1 illustrated embodiment. Such sample-and-hold circuits in effect capture the amplitude at the beginning of a given bit period and store same until the end of that bit period. At the end of that bit period, the stored amplitude is compared with the current amplitude represented by the output signal of the activated sample-and-hold circuit to provide an amplitude comparison of the readback signal at the beginning and end of a given bit period.

The present invention is also applicable to those recording and recovery systems of the so-called synchronized (synced) type. Such systems are characterized by the insertion of synchronization signals adapted to cause an output pulse from the recovery system. Insertion of such synchronization or "sync" signals reduces clocking requirements and generally provides a more reliable recovery of recorded signals. Such improved performance usually enables a recording at greater bit packing densities. In practicing the present invention with such shown "sync" recording systems, the low frequency component having frequency "F" would be periodically recorded as a synchronization signal. The 2F frequency signal component could (but not necessarily absolutely required) still be used to phase-control the clocking channel.

While the invention has been particularly shown and described with reference to preferred embodiments thereof, it will be understood by those skilled in the art that various changes in form and details may be made therein without departing from the spirit and scope of the invention.

What I claim is:

1. A data signal recovery system for recovering data signals recorded in a magnetic media and for converting same to electrical digital signals indicative of such recorded data signals, one bit of digital data being readable from said magnetic media in one-bit period, said recorded digital data being read back as a readback signal having first and second harmonically related signal components and shifts therebetween, the improvement including the combination:

a linear amplifier receiving said readback signal and supplying an amplified signal, one-bit period circuit delay means receiving said readback signals and supplying same one-bit period later as a delayed signal linearly related in amplitude to said amplified signal at least at boundaries of said bit periods, absolute differencing circuit means receiving said amplified signal and said delayed signal and deriving the absolute difference amplitude therebetween in a linear manner, and supplying a third signal which is the absolute difference in amplitude between said amplified signal and said delayed signal, said third signal being characterized as having substantially all undulations in a same polarity with respect to a given reference potential and being of a frequency of only said first signal components, said signal components being suppressed, threshold generation means for generating a threshold voltage of the same polarity as said undulations of said third signal, a signal amplitude detector including amplitude comparison means receiving said threshold voltage and said third signal and supplying a first signal when said third signal has a predetermined amplitude relation to said threshold voltage, clock means receiving said delayed signal and generating gate pulses in timed relationship thereto, elapsed time between successively occurring gate pulses being a bit period, gating means receiving said comparator supplied first signal and said gate pulses, and being jointly responsive thereto to supply output pulses.

2. The subject matter of claim 1, wherein said absolute differencing circuit means comprises a differential amplifier receiving said amplified signal and said delayed signal, and supplying a different signal having the difference amplitude of said amplified and said delayed signal, full wave rectifier means receiving said difference signal and supplying said third signal, and said absolute difference circuit means including band pass filter means for passing said signal component frequencies.

3. The subject matter of claim 2, wherein said first signal component has a wavelength equal to twice the length of magnetic media scan during a given bit period, and said second signal component is an even harmonic of said first signal component, said clock means receiving said delayed signal and being responsive to said second signal component to generate said gate pulses intermediate successive ones of said bit periods.

4. The subject matter of claim 3, wherein said clock means includes reversing switch means for receiving said delayed signal, control means in said clock means responsive to a data pulse supplied by said signal amplitude detector to actuate said reversing switch means to pass a 180° phase-shifted second signal component, and gate pulse generation means connected to said reversing switch means for receiving passed signal components therefrom and responsive thereto to generate the gate pulses.

5. The subject matter of claim 1, wherein said absolute differencing circuit means includes:

a pair of phase splitting means respectively receiving said amplified signal and said delayed signal for supplying complementary and normal phases of said amplified and delayed signals, first linear summing means receiving the complementary phase of said amplified signal and normal phase of said delayed signal, second linear summing means receiving the complementary phase of said delayed signal and the normal phase of said amplified signal, positive OR means receiving said summed signals for supplying said third signal.

6. The system of claim 5, further including AC coupling means electrically interposed between said absolute differencing circuit means and said linear amplifier and one bit period circuit means for AC coupling said amplified signal and said delayed signal to said absolute differencing circuit means, and further AC coupling means electrically interposed between said phase-splitting means and said linear summing means respectively for AC coupling said normal and complementary phases of said amplified and delayed signals from said phase splitting means to said summing means, whereby base line shift in the detection of the readback signal is eliminated.

7 The subject matter of claim 1, further including:

bistable control means responsive to said gate pulses for alternately supplying enabling and disabling signals over a pair of control lines, a pair of sample-and-hold circuit means respectively connected to said control lines and responsive to said enabling signal to perform linear amplifier summing functions and being further responsive to said disabling signal to hold a last occurring signal amplitude therein at least until receiving said enabling signal, said sample-and-hold circuits alternately acting as a linear amplifier and as a one-bit period circuit delay means and being connected to said absolute differencing circuit means for supplying said amplified signal and said delayed signal thereto and alternately and respectively serving the function of said linear amplifier and said one-bit period circuit delay means in alternately successive bit periods.

8. A data signal recovery system for recovering data signals recorded in a magnetic media and for converting such recovered digital data signals to electrical digital signals indicative of such recorded data signals, one bit of digital data being readable from said magnetic media in one bit period, said recorded digital data being read back as a readback signal having first and second harmonically related signal components and shifts therebetween, the improvement including the combination:

a linear amplifier receiving said readback signal and supplying an amplified signal, one bit period linear delay means receiving said amplified signal and supplying a delayed signal having an amplitude substantially identical to said amplified signal but delayed by one of said bit periods, a pair of phase splitting means respectively receiving said amplified and said delayed signals and each supplying complementary and normal phases of said amplified and delayed signals, exclusive OR circuit means receiving said complementary and normal phases of said amplified and delayed signals and combining the complementary phase of one of said signals with the normal phase of the other signal, plus the complementary phase of said other signal with the normal phase of said one signal to supply a third signal having undulations all of the same polarity and characterized by having a frequency substantially all of said one signal component, a plurality of AC coupling means respectively and electrically interposed between said linear amplifier means and said pair of phase splitter means for AC coupling said readback and delayed signals to said phase splitting means and further AC coupling means respectively and electrically interposed between said phase splitting means and said exclusive OR circuit means for AC coupling said normal and complementary phases of said amplified and delayed signals to said exclusive OR circuit means such that base line shift in said third signal is eliminated, and amplitude detection means receiving said third signal and responsive to said third signal exceeding a predetermined amplitude in said given polarity to supply an output pulse.

9. The subject matter of claim 8, further including clock channel means for successively generating gate pulses defining said bit periods, said clock channel including reversing switch means receiving said AC-coupled normal and complementary phases of said delayed signal and alternately supplying one of said phases as a synchronizing signal, gate pulse generator means responsive to said synchronizing signal to supply said gate pulses at a zero axis crossing of said synchronizing signal, and toggle circuit means receiving said output data pulses and connected to said reversing switch means for alternating the selection of said phases of said delayed signal to form said synchronizing signal each time an output data pulse is received.

10. The subject matter of claim 9, further including phase correction means coupled to said toggle means for toggling said reversing switch whenever the phase of said gate pulses is not consistent with the synchronizing signal, said means including an AND circuit jointly responsive to said gate pulses and to said synchronizing signal such that when the gate pulse is received whenever said synchronizing signal is of a predetermined polarity, the reversing switch is actuated to select the opposite phase of said delayed signal.

11. A signal recovery circuit for detecting a low frequency signal component from a signal having mixed low frequency and high frequency signal components with only one of said signal components occurring in a given bit period of recording data signal, the improvement including the combination:

first and second sample-and-hold memory means operative when enabled to establish a stored signal amplitude appearing at an input portion thereof and further operative when disabled to linearly retain the last stored signal amplitude when last previously enabled at least until enabled again, clock means repetitively supplying clock signals identifying beginnings and ends of said bit periods, two-state means responsive to said clock pulses to change signal states alternately between first and second signal states, and connected to said memory means for enabling and disabling same, said first memory means being responsive to said first signal state to be enabled and to said second signal state to be disabled;

said second memory means being responsive to said second signal state to be enabled and to said first signal state to be disabled, linear differencing means coupled to said memory means for differencing the stored signal amplitudes therein to supply a difference signal indicative of such difference, and amplitude detection means receiving said difference signal and being responsive thereto during said clock signal to supply an output signal whenever said difference signal exceeds a predetermined amplitude.

930-4008-00D
PO-1050
(5/69)

UNITED STATES PATENT OFFICE
CERTIFICATE OF CORRECTION

Patent No. 3,597,751 Dated August 3, 1971

Inventor(s) Robert F. Heidecker and Friedrich R. Hertrich

It is certified that error appears in the above-identified patent and that said Letters Patent are hereby corrected as shown below:

Column 12, line 74, after "said" (second occurrence) insert --second--.

Signed and sealed this 22nd day of February 1972.

(SEAL)
Attest:

EDWARD M.FLETCHER,JR.
Attesting Officer

ROBERT GOTTSCHALK
Commissioner of Patents